W. M. KIRCHNER.
Pickle-Dishes.

No. 153,221.

Patented July 21, 1874.

UNITED STATES PATENT OFFICE.

WILLIAM M. KIRCHNER, OF PITTSBURG, PENNSYLVANIA, ASSIGNOR TO JAMES S. AND THOMAS B. ATTERBURY, OF SAME PLACE.

IMPROVEMENT IN PICKLE-DISHES.

Specification forming part of Letters Patent No. 153,221, dated July 21, 1874; application filed March 21, 1874.

*To all whom it may concern:*

Be it known that I, WM. M. KIRCHNER, of Pittsburg, in the county of Allegheny and State of Pennsylvania, have invented a new and useful Improvement in Pickle-Dishes and other concave articles of glassware; and I do hereby declare that the following is a full, clear, and exact description thereof, reference being had to the accompanying drawings making a part of this specification, in which—

Figure 1:
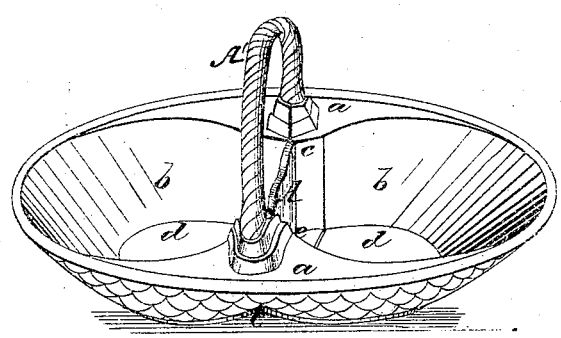
Figure 2:
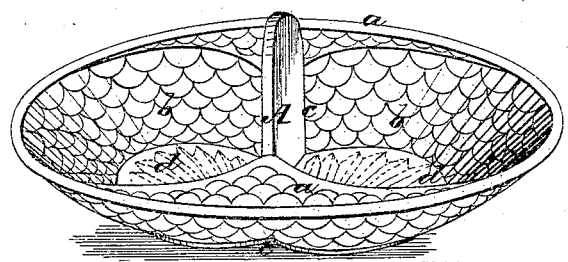
Figure 3:
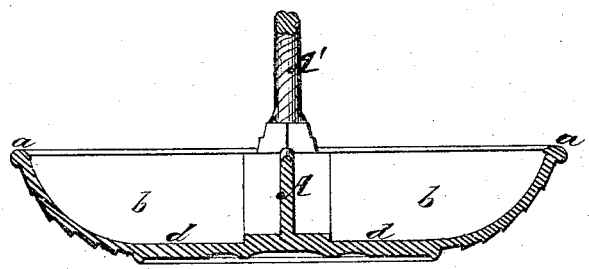
Figure 4:
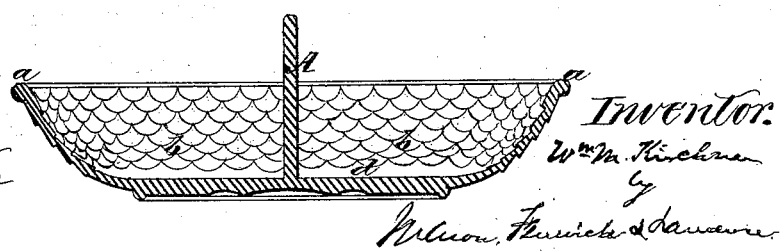

Figure 1 is a perspective view of my improved concave glass article, with a handle arranged over its concave, and a partition across the same. Fig. 2 is a perspective view, showing a modification of the same. Fig. 3 is a longitudinal section of the article shown in Fig. 1. Fig. 4 is a longitudinal section of the article shown in Fig. 2.

The nature of my invention consists in a concave dish, or other article of glassware, which has its bottom depressed below its top, provided with a pressed-glass handle arranged across the concavity, as will be hereinafter described. Second, in the combination of a pressed-glass partition with the pressed concave article of glassware, having a pressed handle arranged across the concavity, as will be presently described.

As an illustration of my invention I have shown a glass pickle-dish. This is formed with a horizontal rim, *a*, the outline of which is oval. Within the margin of this rim two depressed chambers, *b b*, are constructed. These chambers are contracted in width where they adjoin, as shown at *c*, and are flaring from their bottom upward, as indicated at *d*. At the point *c* a vertical transverse partition, A, of pressed glass, is formed, and the dish is thereby divided into two chambers, and made capable of holding different kinds of pickles or other articles. A' represents a curved handle of glass, constructed across the concavity of the dish, so as to span it, and having its ends united to the upper side of the rim of the dish, as shown.

In practice the double-chambered glass dish can be made of two kinds of glass—that is, one-half of the dish of transparent material, and the other half of opal glass, or of glass of different brilliant colors.

I propose to make the concave glass article of any known form, and for different purposes, and therefore do not confine myself to the particular form or article shown.

The whole article is made by pressing, and its production may be effected by a mold adapted to form the concave or bowl, combined with a jointed open-and-shut mold suspended across it, said latter mold having the impression for forming the handle, or both the handle and the partition, made in its two halves. I do not, however, claim any special mould under this patent. I do not claim a dinner-plate made with several compartments, nor do I claim a central stem made separate from the article and then fastened to the article for the purpose of serving as a handle; but—

What I do claim is—

1. A concave dish or other article of glassware which has its bottom depressed below its rim, provided with a pressed-glass handle arranged across the concavity, substantially as and for the purpose described.

2. The combination of the pressed-glass partition, with a concave article of glassware having a pressed handle across the concavity, substantially as and for the purpose set forth.

WM. M. KIRCHNER.

Witnesses:
E. G. KORHAN,
J. ALEX. KNOX.